C. A. Way.
Velocipede.

№ 71561    Patented Nov. 26, 1867.

Witnesses.                                    Inventor.

United States Patent Office.

CHARLES A. WAY, OF CHARLESTOWN, NEW HAMPSHIRE.

*Letters Patent No. 71,561, dated November 26, 1867.*

IMPROVEMENT IN VELOCIPEDES.

*The Schedule referred to in these Letters Patent and making part of the same.*

TO ALL WHOM IT MAY CONCERN:

Be it known that I, CHARLES A. WAY, of Charlestown, in the county of Sullivan, and State of New Hampshire, have invented certain new and useful Improvements in Velocipedes; and I do hereby declare that the following is a full, clear, and exact description of the same, reference being had to the accompanying drawings, making a portion of this specification, in which—

Similar letters of reference indicate corresponding parts in both figures.

This invention consists in a novel arrangement of cranks and short axles with reference to the seat, side rails, and supporting-wheels of a velocipede, whereby the wheels may be operated to propel the apparatus with much greater facility than if the cranks were attached directly thereto.

The invention further consists in so arranging the cords that work the guiding-caster that they shall cross each other in such manner as to act more directly and consequently more efficiently upon the said caster than as hitherto applied.

The invention further consists in making the forward end of the centre rails of the frame of the velocipede lower than the corresponding portion of the side rails thereof, whereby the supporting-wheels may be placed in proper relation with the seat, without interfering with the convenience with which the same may be occupied.

The invention further consists in a novel arrangement of braces with reference to the centre and side rails just mentioned, whereby the said rails are caused to mutually strengthen and support each other.

To enable others to understand the nature and construction of my invention, I will proceed to describe it with reference to the drawings.

Figure 1:
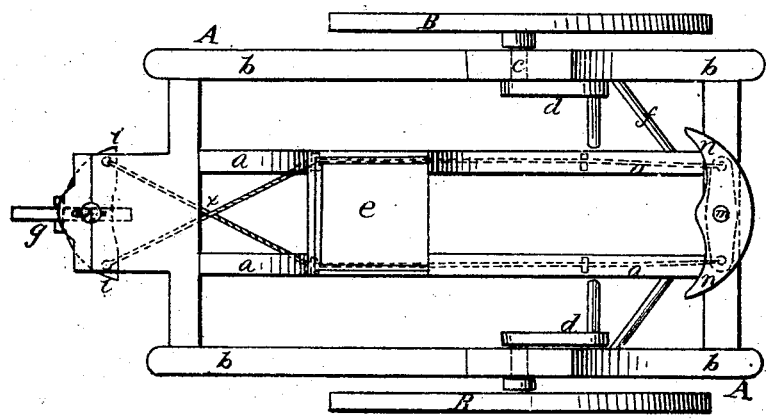
Figure 1 is a plan view of a velocipede constructed according to my invention.
Figure 2:
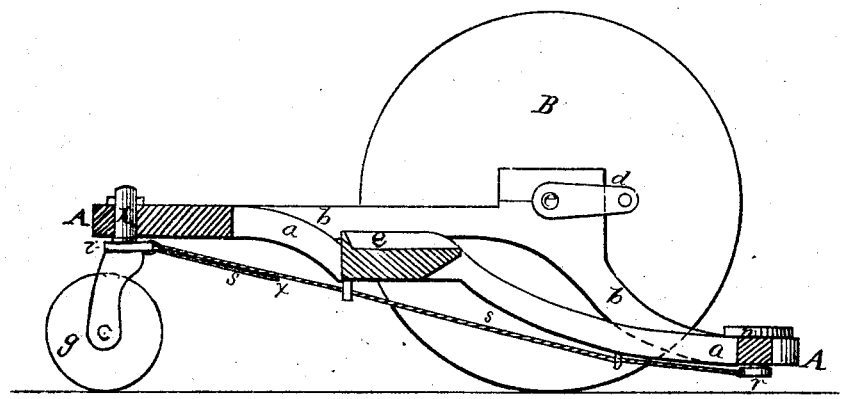
Figure 2 is a vertical longitudinal section of the same.

The frame A of the apparatus is composed for the most part of two centre rails, $a$, and two side rails, $b$. The driving-wheels B are attached to the latter by short axles, $c$, upon the inner ends of which are provided cranks, $d$, which are situated in convenient proximity to a suitable seat, $e$, arranged upon the centre rails aforesaid. The centre rails of the frame A are depressed in front of the seat, as shown more fully in fig. 2, thereby allowing room for the limbs of the person using the velocipede, which would not be afforded if the centre rails were as high at their forward portions as the corresponding parts of the side rails. Arranged at the forward end of the frame A, and extending from each centre rail to the adjacent side rail, is a brace, $f$, which, by connecting the side rails with the centre rails, as just indicated, causes them to support or strengthen each other. At the rear end of the frame A is a guiding-caster, $g$, the vertical arbor $h$ of which is furnished with a cross-bar, $i$. At the front of the aforesaid frame is a short vertical pivot, $m$, to the upper end of which is attached a transverse piece, $n$, while its lower extremity is furnished with a similar cross-piece, $r$. The ends of the cross-bar $i$ are connected with the ends of the cross-piece $r$ by cords $s$, which may be passed through suitable guides or staples attached to the under side of the frame A, and which are crossed, as shown at $x$, in such manner that the turning of the cross-piece $r$ will act to draw the cords a greater distance for the same movement of the said bar, and thus draw or operate the cords to move the same a greater length or distance than would be the case if the said cords ran parallel for their entire length.

The person using the velocipede takes his place in the seat, and places his feet, one against each end of the transverse piece $n$, at the same time grasping the cranks $d$ with his hands, and by rotating the same operates the supporting-wheels to propel the apparatus, the latter being guided or caused to move in any direction by operating the caster $g$ through the agency of the transverse piece $n$, moved by the feet and the bars $r$ $i$ and cords $s$, by which the said piece is connected with the caster.

What I claim as my invention, and desire to secure by Letters Patent, is—

1. The arrangement of the cranks $d$ and short axles $c$ with reference to each other and with the seat $e$, side rails $b$, and supporting-wheels B, substantially as and for the purpose specified.

2. The cords $s$, crossing each other, and arranged to operate the guiding-caster $g$, substantially as and for the purpose specified.

3. The centre rails $a$, arranged with their forward portions lower than the corresponding parts of the side rails $b$, substantially as and for the purpose specified.

4. The arrangement of the braces $f$, in relation with the side rails $b$ and centre rails $a$, substantially as and for the purpose specified.

CHAS. A. WAY.

Witnesses:
HOWARD BAILEY,
E. S. FIFIELD.